United States Patent
Smith et al.

(10) Patent No.: US 8,011,097 B2
(45) Date of Patent: Sep. 6, 2011

(54) METHOD, SYSTEM, AND COMPUTER SOFTWARE CODE FOR REPAIRING A TRANSITION SECTION OF AN ENGINE

(75) Inventors: Alistair Jeffrey Smith, Simpsonville, SC (US); Wayne Alan Demo, Maineville, OH (US); Ronald Lance Galley, Mason, OH (US); Anthony Philip Italiano, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 1295 days.

(21) Appl. No.: 11/566,252

(22) Filed: Dec. 4, 2006

(65) Prior Publication Data
US 2008/0127492 A1     Jun. 5, 2008

(51) Int. Cl.
*B23P 6/00* (2006.01)

(52) U.S. Cl. ............... 29/889.1; 29/402.01; 29/402.07; 29/402.13; 29/402.21; 29/525.14

(58) Field of Classification Search .................. 29/889.1, 29/402.01, 402.09, 402.13, 402.16, 402.18, 29/402.21, 525.14, 402.07; 269/47, 134
See application file for complete search history.

(56) References Cited

U.S. PATENT DOCUMENTS

| | | | | |
|---|---|---|---|---|
| 2,709,568 A | * | 5/1955 | Thielemann | 416/213 R |
| 4,285,459 A | * | 8/1981 | Baladjanian et al. | 228/119 |
| 4,611,744 A | * | 9/1986 | Fraser et al. | 228/119 |
| 4,878,953 A | * | 11/1989 | Saltzman et al. | 148/512 |
| 6,659,332 B2 | * | 12/2003 | Smashey et al. | 228/119 |
| 6,766,939 B2 | * | 7/2004 | Shepherd | 228/112.1 |
| 7,047,612 B2 | * | 5/2006 | Bridges et al. | 29/402.07 |
| 7,146,725 B2 | * | 12/2006 | Kottilingam et al. | 29/889.1 |
| 2007/0039177 A1 | * | 2/2007 | Yoshioka et al. | 29/889.1 |

* cited by examiner

*Primary Examiner* — Derris H Banks
*Assistant Examiner* — Azm Parvez
(74) *Attorney, Agent, or Firm* — Robert Wawrzyn, Esq.; Terry M. Sanks, Esq.; Beusse Wolter Sanks Mora & Maire, P.A.

(57) ABSTRACT

A method for restoring a crack formed within a turbo charger engine transition section, the method including preparing a crack in the transition section to receive a material within the crack, applying the material within the crack, and retaining structural integrity of the transition section proximate the crack while at least one of preparing the crack and applying the material.

9 Claims, 3 Drawing Sheets

METHOD, SYSTEM, AND COMPUTER SOFTWARE CODE FOR REPAIRING A TRANSITION SECTION OF AN ENGINE

FIELD OF INVENTION

The field of invention relates to locomotive engines and, more particularly, to a method, system, and computer software code for refurbishing parts of the locomotive engine.

BRIEF DESCRIPTION OF THE INVENTION

A locomotive is a railway vehicle that provides the motive power for a train. It usually does not have a payload capacity of its own, but instead its sole purpose is to move the train along the tracks. One type of engine used to drive the locomotive is a diesel-electric engine. Examples of such engines include, but are not limited to, high compression, four-stroke turbo-diesel engines with 8-cylinders, 12-cylinders, or 16 cylinders.

These engines include such elements as turbochargers, welded head-liner assemblies, high-strength pistons, solid engine blocks, and heavy-duty crankshafts. In an exemplary embodiment, the turbocharger is a single free-spinning, exhaust-driven turbocharger that provides air to the cylinders at approximately four times atmospheric pressure. Since trains travel through tunnels where the conditions result in temperatures as high as 150 degrees Fahrenheit, these turbochargers are designed to cool in such conditions. In another exemplary embodiment, twin turbochargers are utilized with an electronically fuel-injected engine. The pistons have forged steel crowns so as to effectively resist high stress and heat conditions. The piston crown is bolted to aluminum-allow skirts for lighter weight and increased material recover in overhauls. The pistons use two rings for compression and a third ring for oil control. The exemplary engine block is made of a single piece of sturdy cast iron. Oil passages are cast into the frame to reduce potential leaks. No cooling water, intake air or exhaust gases touch the frame. The one-piece camshaft is forged from high-quality steel and nitride-hardened for long life.

Another part of the engine is the exhaust system of the engine, such as the exhaust manifold. Another part of the exhaust system is the exhaust to turbo transition section. The transition section has to extending enclosures, commonly referred to as exhaust horns and a flange at the base of the horns that extends around the full base of the transition section. The transition section supplies the engine exhaust to the turbocharger. In this part, temperature increases unevenly wherein cracking may result between the exhaust horns, typically two exhaust horns, due to material thickness and thermal gradient variations.

No matter how well any engine is constructed, over time and use, parts will require replacing, and/or remanufacturing. Even though newer engines are being developed, which may be more efficient than currently used engines, locomotive manufacturers, owners, and users realize a financial savings when cost effective techniques and parts are available to refurbish existing engines rather than having to replace an engine. Currently when transition sections are found to have cracking, such as between the exhaust horns proximate to the circular mounting flange, these transition sections have been discarded as scrap. Towards this end, no repair method was known to refurbish this part.

BRIEF DESCRIPTION OF THE INVENTION

Exemplary embodiments of the invention are directed towards a method, system, computer software code for refurbishing parts of a locomotive engine. Towards this end a method for restoring a crack formed within a turbo charger engine transition section. The method includes preparing a crack in the transition section to receive a material within the crack. The method further includes applying the material within the crack, and retaining structural integrity of the transition section proximate the crack while at least one of preparing the crack and applying the material.

In another exemplary embodiment, a computer software code for a computer for autonomously restoring a crack formed in a transition section of a turbocharger engine is disclosed. The computer software code includes a computer module for operating an instrument for preparing a crack in the transition section to receive a material within the crack. A computer module for operating an instrument for applying the material within the crack is also disclosed. Further disclosed is a computer module for operating an instrument for retaining structural integrity of the transition section proximate the crack while preparing the crack and applying the material.

In yet another exemplary embodiment, a system for restoring a crack formed on a transition section of a turbocharger engine is disclosed. The system includes an apparatus to expand at least one of a depth and width of a crack area. A device to clean the crack area is also disclosed. A welding device is also provided. A material that is applied to the crack area with the welding device is included. Furthermore, a device to retain a shape of the transition section is disclosed.

BRIEF DESCRIPTION OF THE DRAWINGS

A more particular description of exemplary embodiments of the invention briefly described above will be rendered by reference to specific embodiments thereof that are illustrated in the appended drawings. Understanding that these drawings depict only typical embodiments of the invention and are not therefore to be considered to be limiting of its scope, exemplary embodiments of invention will be described and explained with additional specificity and detail through the use of the accompanying drawings in which.

DETAILED DESCRIPTION OF THE INVENTION

Figure 1:
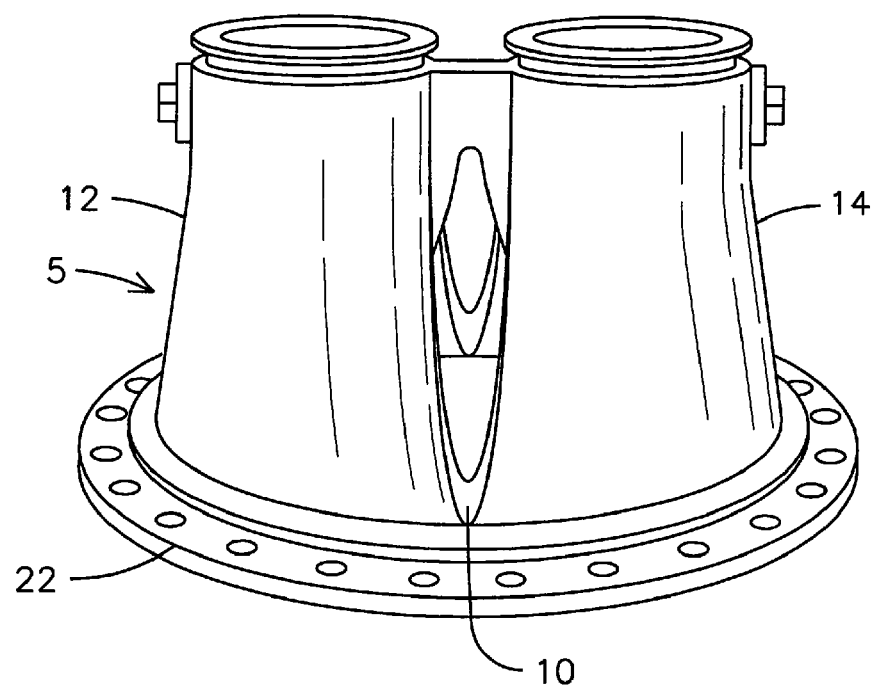
FIG. 1 depicts an exemplary embodiment of a transition section.

Exemplary embodiments of the invention are directed towards the problems in the art by providing a system, method, and computer implemented method for refurbishing parts of a locomotive engine. More specifically, in an exemplary embodiment a method, system, and computer process is disclosed to fix cracks in a transition section of an engine that has a turbocharger so that it is durable to withstand engine operation as well as an original transition section. Towards this end, a weld repair application is utilized to fill the cracks.

Reference will now be made in detail to the embodiments consistent with exemplary embodiments of the invention, examples of which are illustrated in the accompanying drawings. Wherever possible, the same reference numerals used throughout the drawings refer to the same or like parts.

Figure 2:
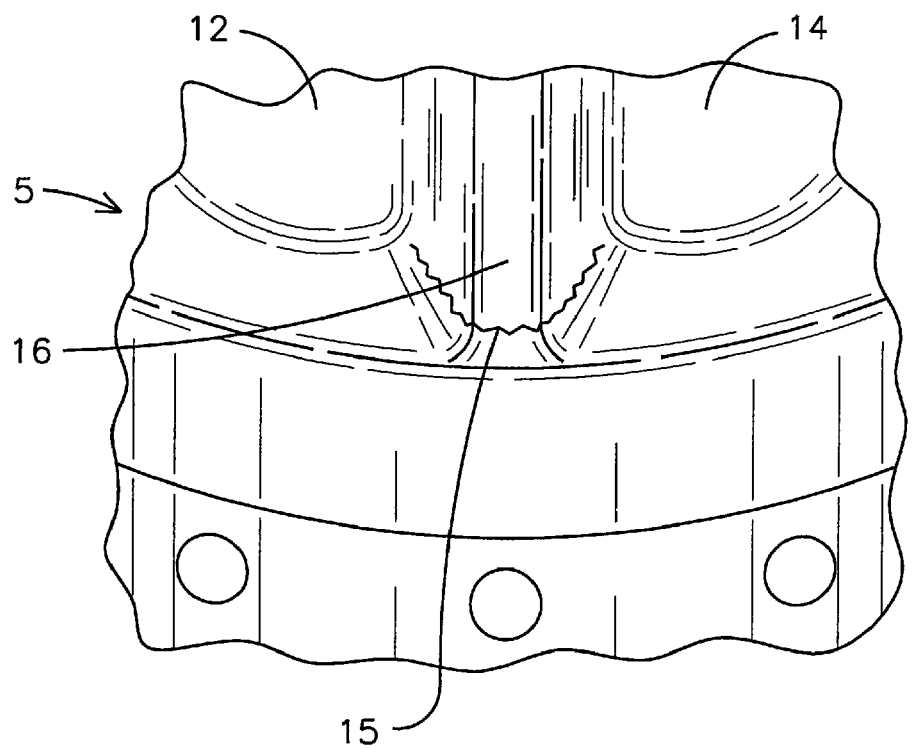
FIG. 2 depicts an exemplary embodiment of an exploded area of an underside of the transition section.

FIG. 1 depicts an exemplary embodiment of a transition section. A crack 10 may form between the two horns 12, 14, on the outside of the transition section 5. FIG. 2 depicts an exemplary embodiment of an exploded area of an underside of the transition section. As illustrated, a crack 15 may also form at the ridge 16, or rib, between the two horns 12, 14 on the underside of the transition section 5. Typically, a crack 10, 15 is formed therethrough the transition section 5 where the crack 10, 15 is visible on the outside and the inside, or underside, of the transition section 5.

Figure 3:
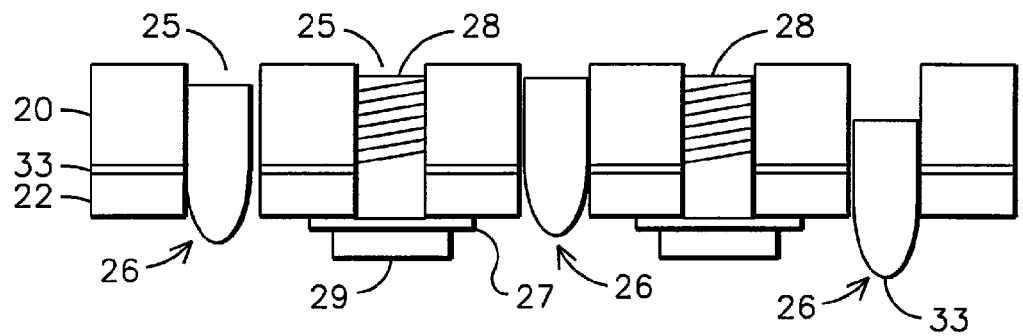
FIG. 3 depicts an exemplary embodiment of a cross section of a welding fixture.

FIG. 3 depicts an exemplary embodiment of a welding fixture. The fixture 20 is attached to a flange 22 of the transition section 5. The fixture 20 is provided to maintain the structural shape, or integrity, of the flange 22 and overall transition section 5 during the crack repair process. The fixture 20 is secured to the flange 22 as shown. Specifically, as discussed herein, holes 25, or openings in the flange 22 and fixture 20 are lined up so that bolts 28 can be positioned therethrough the matching openings 25. Alignment bolts 26 are used to insure the openings 25 are aligned to receive the bolts 28. In an exemplary embodiment the alignment bolts are bullet nosed bolts 26, which are shown being positioned between several adjacent fixture/flange combination openings 25. Through the other hole, or opening, fixture/flange combination retaining bolts 28 are fixed therethrough.

Figure 4:
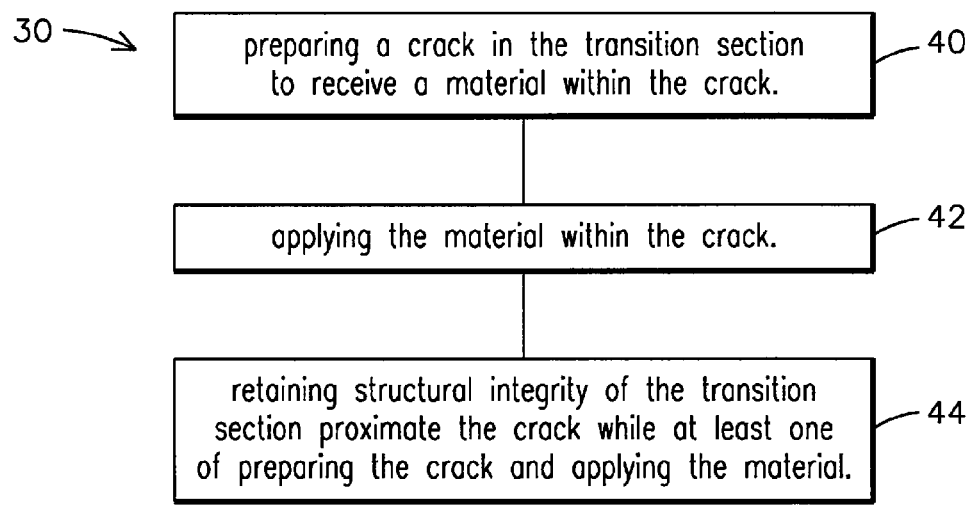
FIG. 4 depicts an exemplary embodiment of a flow chart of steps to fix a crack in a transition section of an engine.

FIG. 4 depicts an exemplary embodiment of a flow chart of steps to fix a crack in a transition section of an engine. As illustrated in the flow chart 30, a crack in the transition section is prepared to receive a material within the crack step 40. The material is applied within the crack step 42. Structural integrity of the transition section is retained, specifically near the crack while the crack is being prepared to receive the material and/or while the material is being applied step 44.

Figure 5:
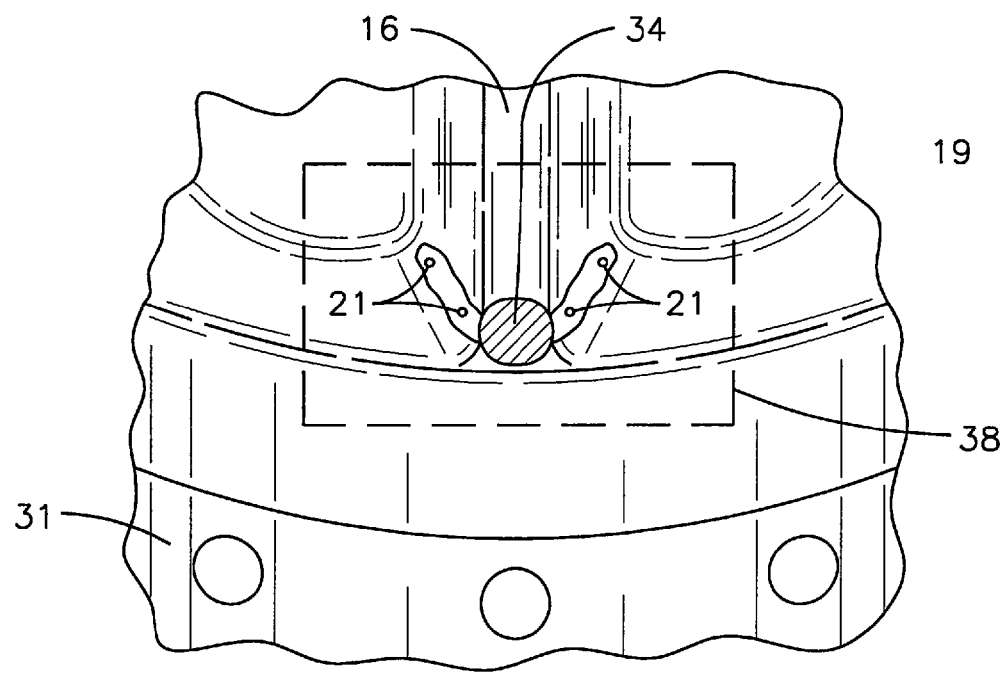
FIG. 5 depicts an exemplary embodiment of the exploded area of the underside of the transition section partially repaired.

FIG. 5 depicts an exemplary embodiment of the exploded area of an underside of the transition section partially repaired. More specifically, FIG. 5 illustrates the underside of the transition section 5 where the crack 15 has occurred may be arc gouged. In an exemplary embodiment it is gouged to a depth of approximately seventy percent of the material depth. Gouging should only occur on the sides of the rib 16, or ridge. The gouged area 19 should be cleaned to remove any material left from the gouging. In an exemplary embodiment, this is accomplished by peening the area. Holes 21 should be formed therethrough the gouged area 19, such as approximately ⅛ inch in diameter holes. In an exemplary embodiment, the arc device is used to create these holes, such as by changing the torch tip to a size configured to create the size holes desired.

Any defects in the gouged, or oxidized, area 19 should be grinded, such as with carbide burr. In an exemplary embodiment, the width of the gouged area 19 is no larger than approximately a quarter of an inch wide. Minimizing the width may assist with controlling shrinkage and/or distortion during the rest of the process.

With the underside of the transition section visible, welding fixture 20 is placed on a flange 22 of the transition section 5. As illustrated in FIG. 3, the flange 22 has holes 25 therethrough the flange 20 through which bolts 26, 28 may be placed when attaching the transition section to a turbocharger. The welding fixture 20 has holes 25 therethrough which match with the location of the holes 25 therethrough the flange 22.

Bolts, such as in an exemplary embodiment bullet nosed bolts 26, are inserted downward into specific holes 25 of the flange 22 and fixture 20 to align the holes 25. In an exemplary embodiment the section of the diameter of these bolts 26 that have a tapered diameter, with the major diameter being slightly larger than the holes 25, thus requiring that the bolts 26 are threaded into the holes 25.

Retaining bolts 28 are inserted into other holes 25, in an exemplary embodiment, from the flange 22 side of the holes 25. In an exemplary embodiment, these bolts 28 are threaded to the fixture 20, and washers 27 are used under the head 29 of the bolts 28. These bolts 28 are tightened until nearly being unable to twist further, or where the bolts 28 are snug within their respective openings 25. Those skilled in the art will readily recognize that the fixture 20 may be fixed to the transition section 5 either before or after arc gouging takes place.

At locations 31 away from the crack locations, the flange may be heated, such as with, in an exemplary embodiment, an oxy-natural gas torch. Heating should be accomplished just enough to allow for expansion of the transition section 5. In an exemplary embodiment, the transitional section 5 is heated no higher than approximately 300 degrees Fahrenheit (149 degrees Celsius (C)). As the transition section 5 heats, the bullet nose bolts 26 are further threaded into the holes 25 with a goal of having the bullet nose head 33, part of the bullet nose bolts 26 extending from the flange 22 holes 25. As illustrated in FIG. 3 the far right bullet nose bolt 26 is an exemplary embodiment of this preferred configuration. Once all bullet nose bolts 26 are fully inserted, the retaining bolts 28 may be tightened. When done, in an exemplary embodiment, the gap 33 between the flange 22 and the fixture 20 should be less than approximately 0.005 inches (approximately 0.127 millimeters (mm)).

A weld 34 may be placed across the rib 16 so as to provide dimensional stability to the rib 16 during the rest of the process. This weld 34 may be removed, as discussed herein, and/or later reapplied as needed and/or required. Welding of the cracks 15 from the underside of the transition section 5 may now be accomplished. In an exemplary embodiment, the area adjacent to a repair area 38, such as but not limited to within approximately three inches of the repair area 38, may be pre-heated to approximately 500 degrees Fahrenheit (approximately 260 degrees C.). In an exemplary embodiment a first weld pass is made with approximately 0.62 inch (approximately 15.748 mm) weld wire wherein the desired thickness should not exceed approximately 0.070 inches (approximately 1.778 mm). Additional passes may be made wherein, in an exemplary embodiment, each additional pass may use approximately a 0.125 inch wire (approximately 3.175 mm). The build up of weld though should not, in an exemplary embodiment, exceed a thickness of approximately 0.125 inches (approximately 3.175 mm) in thickness. Though not always needed, weld beads may be cleaned between passes, such as with a carbide bit. The interpass temperature, or temperature of the repair area between weld passes, should be maintained between approximately 300 to 400 degrees Fahrenheit (approximately 149 to 204 degrees C.). In an exemplary embodiment, weld passes followed by cleaning the weld beads may be repeated until the repair area is filled.

A similar process should be used to fill the crack 10 on the outside of the transition section 5. Specifically, the full length of the crack 10 may be arc gouged, such as to approximately 60 percent of the depth of the material that makes up the transition section. If holes 21 were formed therethrough when arc gouging the underside of the transition section 5, these holes 21 may be used as a guide determine the depth and crack position.

The crack area on the outside of the transition section may be grinded, such as with approximately a 0.25 inch (approximately 6.35 mm) carbide burr. The gouge may be shined, or polished. The width of the gouge should be approximately 0.25 inches (approximately 6.35 mm) wide. As with the underside gouge, minimizing the width of the outside gouge may help control shrinkage/distortion.

The area adjacent to the outside gouge area, such as an area within approximately three inches, may be pre-heated to approximately 500 degrees Fahrenheit (approximately 260 degrees C.). In an exemplary embodiment, preheating may be checked with 300, 400, 500 and 600 temple sticks. Temple sticks are wax crayons that are applied to the part where temperature is to be checked. The wax melts at a specific temperature where the number corresponds to the melting temperature of that crayon, typically in degrees F. Welding may next occur. In an exemplary embodiment, a first weld pass is made with approximately 0.62 inch (approximately 15.748 mm) wire that does not exceed approximately 0.070 inches (approximately 1.778 mm) in thickness. Each addition weld pass may be made using approximately 0.125 inch (approximately 3.175 mm) wire wherein a weld build-up should not exceed approximately 0.125 inches (approximately 3.175 mm) in thickness.

In an exemplary embodiment cleaning of the weld bead is performed, such as between each weld pass with a carbide bit. Between each weld pass, the temperature of the repair area may be maintained between approximately 300 to 400 degrees Fahrenheit (approximately 149 to 204 degrees C.). A weld pass followed by cleaning the weld bead should be accomplished until the repair area is filled.

Arc gouging should be performed to remove the weld bead 34 applied to the underside of the transition section 5 on the rib 16. This weld bead 34 may be removed to a depth of approximately fifty percent of the original rib material, or approximately half an inch. The gouged area is grinded out, such as with, but not limited to, a quarter inch carbide burr. The gouge is shined wherein a width of approximately a quarter of an inch is maintained so as to help control shrinkage/distortion during heating and/or welding.

As done previously, an area adjacent to the repair area, this time the rib area, is heated to approximately 500 degrees Fahrenheit (approximately 260 degrees C.). The temperature may be checked with 300, 400, 500, and/or 600 temple sticks. A first weld pass is made with approximately 0.062 inch wire (approximately 1.575 mm) wherein the thickness does not exceed approximately 0.07 inches (approximately 1.778 mm). Each additional pass may be made with approximately 0.125 inch (approximately 3.175 mm) wire wherein weld build-up should not exceed approximately 0.125 (approximately 3.175 mm) inches in thickness. In an exemplary embodiment, between each weld pass, the previously placed weld bead is cleaned, such as with a carbide bit. With respects to this cleaning of a weld and all others disclosed above, those skilled in the art will readily recognize that cleaning is not necessarily required after each weld pass. Between each weld pass, temperature at the repair area may be maintained between approximately 300 to 400 degrees Fahrenheit (approximately 149 to 204 degrees C.). If required, re-heating may be performed.

Once all welding is completed, the transition section 5 may be allowed to cool, such as until a human can touch the transition section 5, before removing the fixture 20. If removing of the bolts 26, 28 is difficult, in an exemplary embodiment, an area of the transition section 5 may be heated, preferably away from the repaired area 38, such as when done when attaching the fixture 20 to the transition section 5.

In an exemplary embodiment, all surfaces of the weld are in a flat position during welding. An exemplary weld apparatus is an HW-20 torch model with an electrode strikeout distance of 5/8 inches (approximately 15.875 mm) and an electrode diameter of 3/32 inches (approximately 2.381 mm) wherein the torch is produced with an Argon gas. An exemplary metal used for the weld is Aerospace Material Specification (AMS) 5680. Aerospace Material Specification is an aerospace industry standard specification and controls many materials. AMS 5680 is a specific set of requirements for 410SS weld wire.

Figure 6:
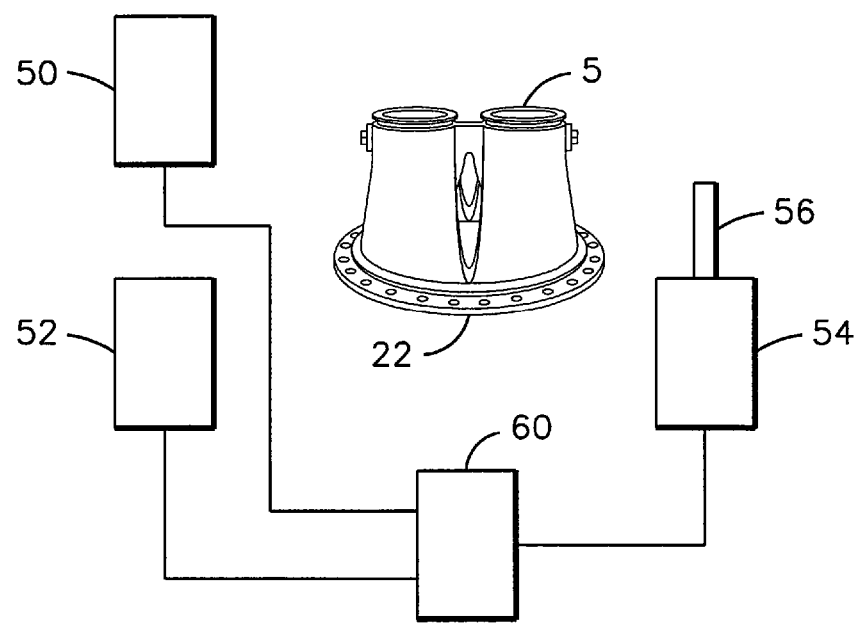
FIG. 6 depicts an exemplary embodiment of components that are used to fix a crack in a transition section of an engine.

FIG. 6 depicts an exemplary embodiment of components that are used to fix a crack in a transition section of an engine. As illustrated an apparatus 50 to expand a depth and/or width of a crack area is provided. As discussed above, this is accomplished by a device that arc gouges the crack. The same apparatus may create holes therethrough the crack. A device 52 to clean the crack area is also provided. As disclosed above, an exemplary embodiment of such a device is a carbide burr. A welding device 54 and a material 56 that is applied to the crack area with the welding device are illustrated. An exemplary welding device 54 is disclosed above as well as an exemplary material. A fixture 20 to retain a shape of the transition section is also shown and previously discussed.

Those skilled in the art will readily recognize that the components disclosed in FIG. 5 may be all automated. For example, a processor 60 may be used to automate the process of repairing used transition sections. The processor would operate the components disclosed in FIG. 5.

Thus in general, those skilled in the art will readily recognize the exemplary embodiment of the system and method may be automated, or autonomous in operation. Towards this end, persons skilled in the art will recognize that an apparatus, such as a computer, including a CPU, memory, I/O, program storage, a connecting bus, and other appropriate components, could be programmed or otherwise designed to facilitate the practice of the method of the invention. Such a system would include appropriate program for executing the method of the invention wherein computer software modules are provided.

Also, an article of manufacture, such as a pre-recorded disk or other similar computer program product, for use with a data processing system, or computer, could include a storage medium and program means recorded thereon for directing the data processing system to facilitate the practice of the method of the invention. Such apparatus and articles of manufacture also fall within the spirit and scope of the invention.

Broadly speaking, the technical effect provides a method, apparatus, and computer program for refurbishing parts of an engine, such as a transition section used in a locomotive diesel turbocharger engine. To facilitate an understanding of the exemplary embodiments of the invention, it is described above with reference to specific implementations thereof. Exemplary embodiments of the invention may be described in the general context of computer-executable instructions, such as program modules, being executed by a computer. Generally, program modules include routines, programs, objects, components, data structures, etc. that performs particular tasks or implement particular abstract data types. For example, the software programs that underlie the invention can be coded in different languages, for use with different platforms. Furthermore, exemplary embodiments of the invention may be described in the context of a web portal that employs a web browser. It will be appreciated, however, that the principles that underlie exemplary embodiments of the invention may be implemented with other types of computer software technologies as well.

Moreover, those skilled in the art will appreciate that exemplary embodiments of the invention may be practiced with other computer system configurations, including hand-held devices, multiprocessor systems, microprocessor-based or programmable consumer electronics, minicomputers, mainframe computers, and the like. Exemplary embodiments of the invention may also be practiced in distributed computing environments where tasks are performed by remote processing devices that are linked through a communications network. In a distributed computing environment, program modules may be located in both local and remote computer storage media including memory storage devices.

While exemplary embodiments of the invention has been described in what is presently considered to be a preferred embodiment, many variations and modifications will become apparent to those skilled in the art. Accordingly, it is intended that the exemplary embodiments of the invention not be limited to the specific illustrative embodiment but be interpreted within the full spirit and scope of the appended claims.

What is claimed is:

1. A method for restoring a crack formed within a turbo charger engine transition section, the method comprising:
    preparing a crack in the transition section to receive a material within the crack;
    applying the material within the crack; and
    retaining structural integrity of the transition section proximate the crack by at least one of welding material across a rib section of the transition section to increase structural integrity near the crack, attaching a fixture to a flange area of the transition section with the fixture having openings that coincide with openings in the flange area with bolts positioned through the openings to secure the fixture to the transition section, and minimizing a width of the crack when preparing the crack while at least one of preparing the crack and applying the material.

2. The method of claim 1 wherein preparing the crack comprises at least one of arc gouging the crack, creating a hole therethrough the crack, grinding out defects within the crack, and polishing the crack.

3. The method of claim 1 wherein applying the material comprises heating a part of the transition section away from the crack, and welding material within the crack.

4. The method of claim 1 wherein preparing the crack and applying the material further comprises preparing the crack and applying the material on at least one of an underside of the transition section and an outside of the transition section.

5. The method of claim 3 further comprises cleaning a weld bead after welding material within the crack.

6. The method of claim 2 further comprises gouging a crack on a first side and a second side of a rib located on an underside of the transition section wherein the rib is not gouged.

7. The method of claim 1 wherein at least one bolt is a bullet nosed bolt that is proximate the openings in the fixture and the flange area.

8. The method of claim 1 further comprises heating the flange area and fixture when attaching the fixture to the flange area.

9. The method of claim 1 wherein the steps of preparing a crack in the transition section to receive a material within the crack, applying the material within the crack, and retaining structural integrity of the transition section proximate the crack while at least one of preparing the crack and applying the material further comprises applying these steps to at least one of a crack on an underside of the transition section excluding a rib formed by where a first horn section and a second horn section of the transitions section meet, to a crack on a outside of the transition section, and to the rib after the crack on the underside and the outside are fixed first.

* * * * *